Sept. 9, 1924.
H. T. MASON
TREAD FOR BOOTS OR SHOES
Filed Sept. 7, 1923
2 Sheets—Sheet 1
Fig-1-
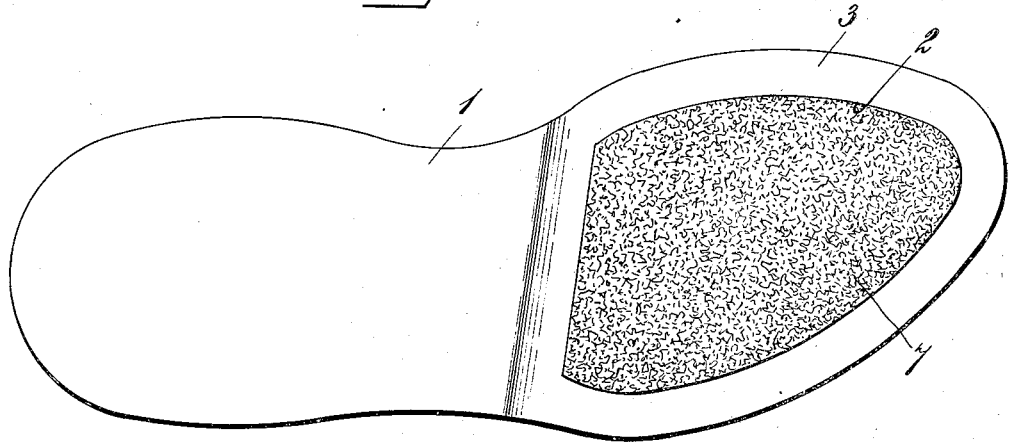
Fig-2.
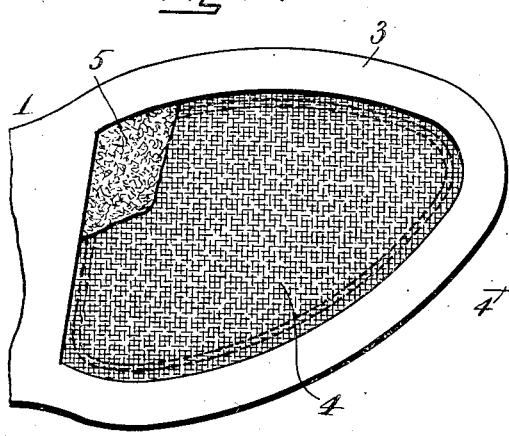
Fig-3.
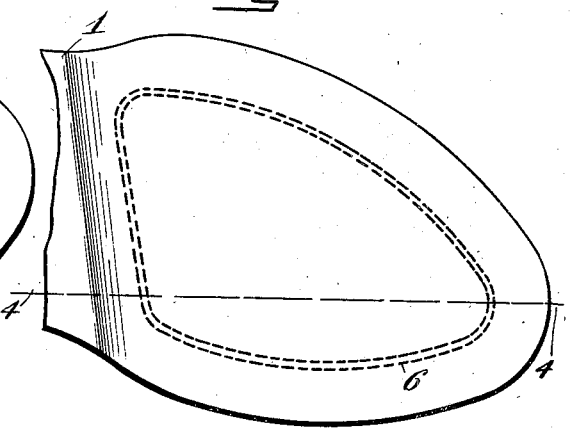
Fig-4-
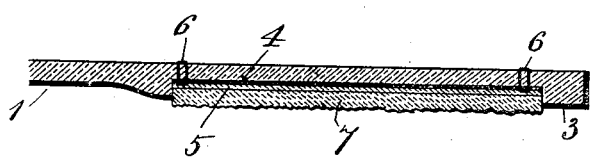
INVENTOR
Herbert T. Mason
By [signature]
ATTORNEYS Sept. 9, 1924.

H. T. MASON

TREAD FOR BOOTS OR SHOES

Filed Sept. 7, 1923  2 Sheets-Sheet 2

1,507,844

INVENTOR=
Herbert T. Mason
BY
ATTORNEYS=

Patented Sept. 9, 1924.

1,507,844

UNITED STATES PATENT OFFICE.

HERBERT T. MASON, OF BROOKFIELD, MASSACHUSETTS.

TREAD FOR BOOTS OR SHOES.

Application filed September 7, 1923. Serial No. 661,517.

*To all whom it may concern:*

Be it known that I, HERBERT T. MASON, of Brookfield, in the county of Worcester and State of Massachusetts, have invented a new and useful Improvement in Treads for Boots or Shoes, of which the following is a full, clear, and exact description, reference being had to the accompanying drawings, forming a part of this specification, in explaining its nature.

The present invention relates to an improvement in treads for boots or shoes.

Among the objects of the invention is to provide a wearing tread of desirable flexibility and resilience and one that may be easily applied to the boot or shoe during its processing or renewed as occasion may require. It is my further object to provide the tread with a replaceable wearing insert of some relatively soft flexible material in comparison with the material constituting the body of the tread. In other words, I seek to provide not only a renewable tread but also a renewable wearing insert which may be replaced without disturbing the main body of the tread.

The invention can best be seen and understood by reference to the drawings, in which—

Figure 1 is a plan of an embodiment of the invention.

Fig. 2 is a plan of the interior portion thereof.

Fig. 3 is a plan of the reverse side of a portion of the tread shown in Fig. 1.

Fig. 4 is a section on the line 4—4 of Fig. 3.

Referring to the drawings:—

Figure 5:
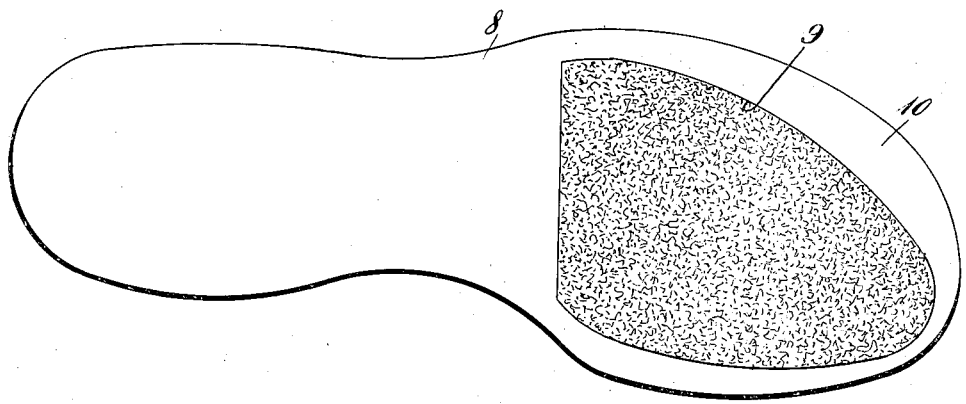
Fig. 5 is a plan of a further embodiment of the invention.

In Figures 1 to 4, inclusive, 1 represents the body of the tread comprising a sole of common type manufactured for attachment to boots or shoes from rubber compound and commonly referred to as a fibre sole. In substance the sole is fairly stiff though flexible.

Formed within the body 1 of the tread, in a part on which the most wear comes, is a cavity 2 which may be formed during the moulding of the tread or sole. The cavity is formed inset from the surrounding edge of the tread to leave an edge 3 by which the tread or sole may be attached to the boot or shoe in the usual way.

The cavity 2 is provided with a backing 4 preferably of some strong fibrous material having a rubber facing 5. This facing is preferably of vulcanized rubber or rubber compound frictioned onto the backing 4. The backing 4 is secured to the body 1 of the tread by cement or other fastening, which will make a fairly permanent fastening of the backing to the tread or such that it cannot be easily removed. I prefer that the backing be secured to the tread not only by cementing but also by stitching 6.

Located within the cavity 2 is a filling 7 of soft unvulcanized rubber or other relatively soft wearing material in comparison with the material constituting the body of the tread. The filling preferably projects slightly from the cavity beyond the face of the tread body in order to form a true wearing surface for the tread. The filling 7 is secured to the rubber-faced backing 5 by cementing it to the rubber face of said backing, the cementing being such as to prevent dislodgment of the filling as the tread is used, but permitting of the filling being stripped from the backing for purposes of replacement as occasion may require.

Figure 6:
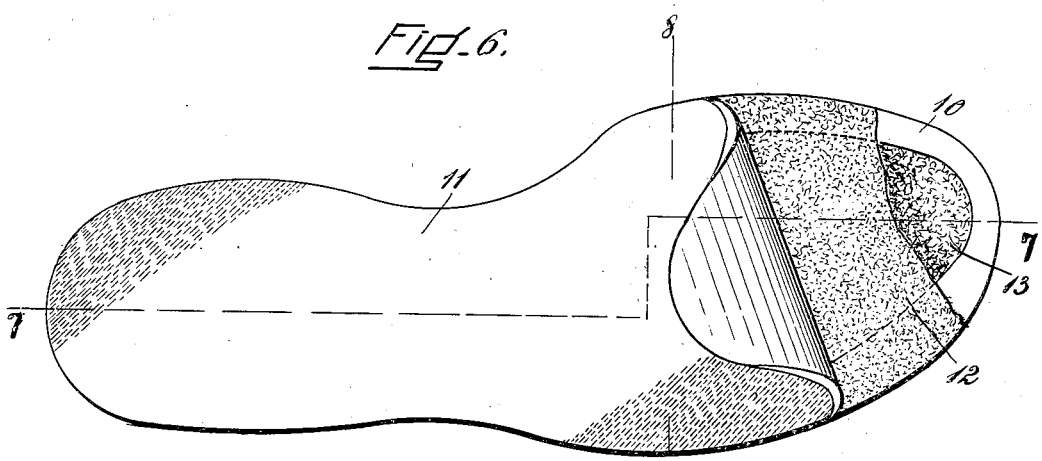
Fig. 6 is a plan of the reverse side of the tread shown in Fig. 5, with a portion thereof exposed to show interior construction.
Figure 7:
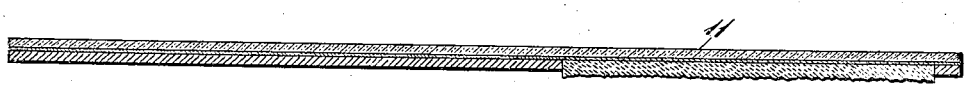
Fig. 7 is a section on the line 7—7 of Fig. 6.
Figure 8:
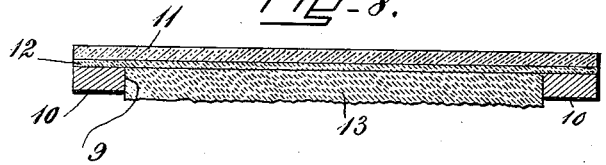
Fig. 8 is an enlarged section on the line 8—8 of Fig. 6.

In Figs. 5 to 9, inclusive, the invention is shown applied to a tread comprising a leather sole of the ordinary type. This sole is provided with a cavity 9 formed by cutting out a portion of the sole to leave a surrounding edge 10 by which the sole may be secured to a boot or shoe in the usual manner. The body 8 of the tread or sole is provided with a backing 11 of any suitable tough material and preferably of vulcanized rubber compound in sheet form and having a rubber facing 12 preferably of vulcanized rubber or rubber compound frictioned onto the backing 11. The rubber-faced backing extends over the rear face of the entire sole or tread and over the cavity formed therein, the same providing a rubber-faced backing for the cavity. This backing is cemented to the tread or sole and when the tread or sole is secured to the boot or shoe as by stitching the backing will be securely fixed to the tread.

Located within the cavity 9 is a filling 13 of soft unvulcanized rubber or other relatively soft wearing material in comparison with the leather constituting the body of the tread. This is secured to the rubber-faced backing 11 by cementing it to the rubber face of said backing the same as in the construction first described.

While I have shown the invention applied to the toe portion of a tread, it may be applied to any wearing part of the tread including its heel portion. In other words, the heel portion of a sole or tread of rubber compound like that first described may be provided with such a replaceable insert, or a tread attachable to the leather heel of a boot or shoe may have a similar replaceable insert or inserts.

According to the construction thus provided there is obtained not only a replaceable insert but also desirable flexibility and resiliency in a tread which can be best secured by the use of a soft unvulcanized rubber or other soft wearing material as described and which overcomes many of the disadvantages arising from making the entire tread out of soft unvulcanized rubber as is now commonly done.

It is evident that the wearing surface of soft unvulcanized rubber will require replacement more often than the body of the tread, which also may be renewed in the usual manner.

Having thus fully described my invention, I claim and desire to secure by Letters Patent of the United States:—

A tread for boots or shoes comprising a body portion of some stiff flexible material presenting an outer edge surrounding an interior cavity, a backing to said cavity of some strong material attached to the body of the tread and having a facing of rubber, means for securely fastening said rubber-faced backing to said body of the tread, a filling of some relatively soft wearing material in comparison with the material constituting said body contained within said cavity, and means for securing said filling to said rubber-faced backing in a manner whereby the filling may be removed therefrom without disrupting said backing.

HERBERT T. MASON.